Jan. 23, 1962     H. C. OPPEL     3,017,933
DIGGING WHEEL FOR SUGAR BEET HARVESTERS
Filed Nov. 19, 1959     2 Sheets-Sheet 1

INVENTOR.
HEINZ CARL OPPEL
BY
ATTY.

Jan. 23, 1962    H. C. OPPEL    3,017,933
DIGGING WHEEL FOR SUGAR BEET HARVESTERS
Filed Nov. 19, 1959    2 Sheets-Sheet 2

INVENTOR.
HEINZ CARL OPPEL
BY
*Truckwell*
ATTY.

United States Patent Office 3,017,933
Patented Jan. 23, 1962

3,017,933
DIGGING WHEEL FOR SUGAR BEET
HARVESTERS
Heinz Carl Oppel, 212 S. 5th St., Boise, Idaho
Filed Nov. 19, 1959, Ser. No. 854,137
2 Claims. (Cl. 171—58)

This invention relates to an improved digging wheel for sugar beet harvesters.

The wheel with which this application is concerned is to be used on beet harvesters, wherein two wheels are angularly disposed in order to grip the beets in the ground and lift them from the soil in a continuous operation.

It is an object of this invention to provide a harvesting wheel having a replaceable rim.

It is also an object of this invention to provide a harvesting wheel having maximum strength and resistance to packing of dirt and rocks.

It is a further object of this invention to design a harvesting wheel having high traction and deep penetration, while providing a smooth surface to gently lift the beets.

These and further objects will become more evident from the following disclosure and the accompanying drawings which illustrate one preferred form of the invention. It is to be emphasized that this specific form is illustrative only and is not intended to limit the scope of the invention except as it is defined in the annexed claims.

Figure 1:
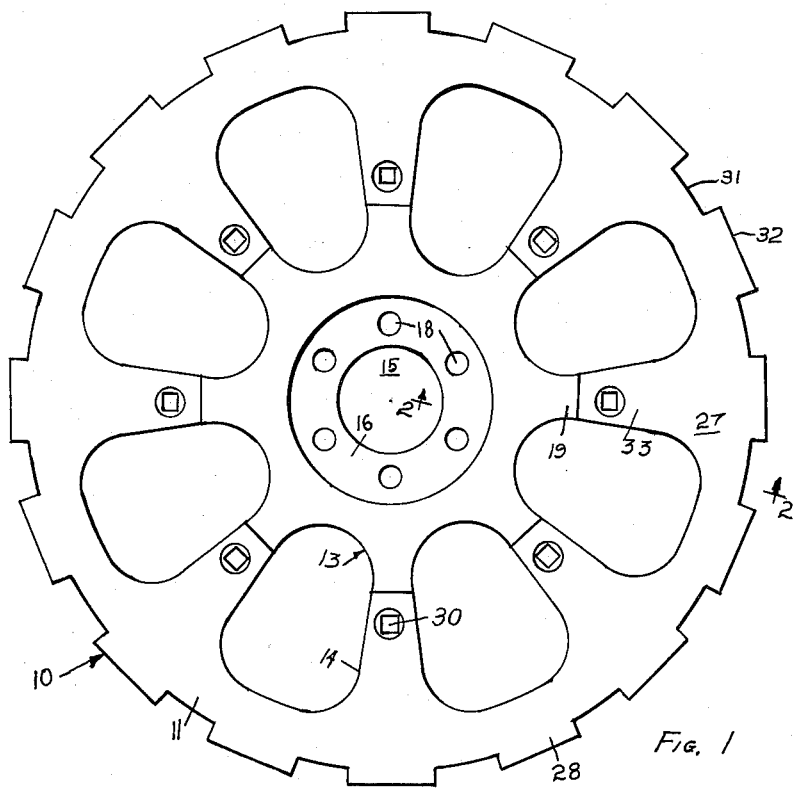
FIGURE 1 is a plan view of an assembled wheel before positioning the bolts, showing the inner side of the hub and rim.
Figure 3:
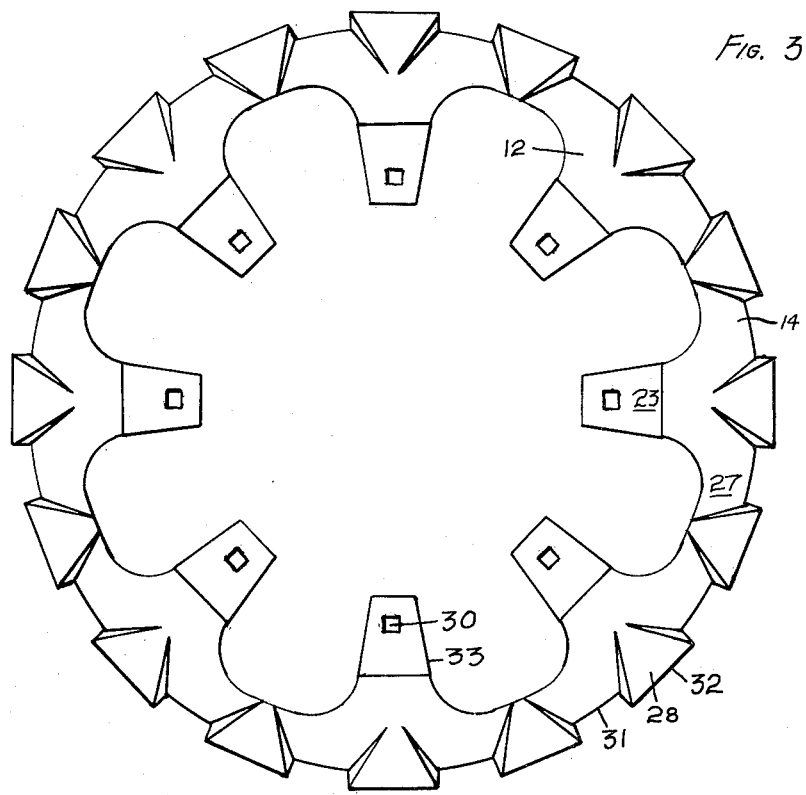
FIGURE 3 is a plan view of the rim showing the outer side of the rim.
Figure 4:
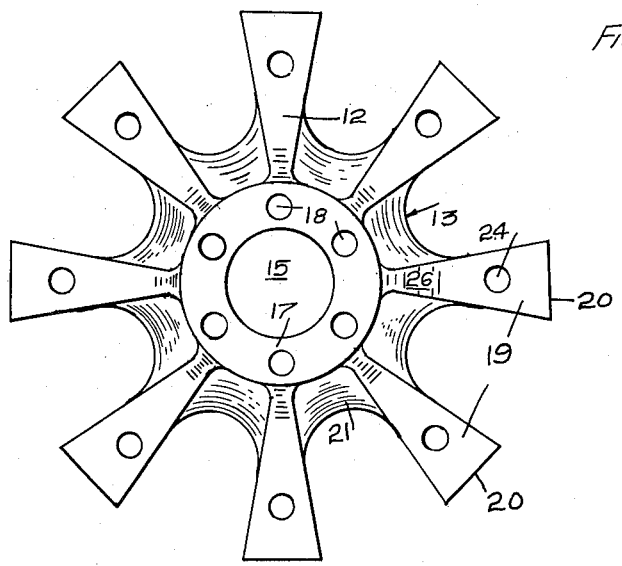
FIGURE 4 is a plan view of the hub showing the outer side of the hub.

In describing the wheel, the side shown in FIGURE 1, which in normal operation faces the remaining wheel of the usual pair, shall be called the inner side. The opposite side, shown in FIGURES 3 and 4 which is outside on a harvester shall be called the outer side. In the drawings, the inner side is generally designated 11 and the outer side is generally designated as 12.

The wheel, generally designated as 10, is composed of two parts, a hub 13 and a rim 14. Hub 13 has a central aperture 15 designed to fit a mounting axle on a beet harvester. This aperture 15 is surrounded on sides 11 and 12 by smooth parallel surfaces 16 and 17 respectively, through which a circular row of mounting bolt apertures 18 are formed.

Radiating from the edge of surfaces 16 and 17 are a plurality of spokes 19 which have increasing width at their outer ends and are squared as shown at 20. The inner ends of spokes 19 are connected by curved webs 21. A stepped ridge 22 is provided in each spoke 19 in surface 11 which serves to position a corresponding ridge 23 on the rim 14. This mating relationship can be seen in FIGURE 2. A bolt hole 24 is also provided in each spoke within the ridge 22 which is adapted to receive the connecting bolts 25.

Figure 2:
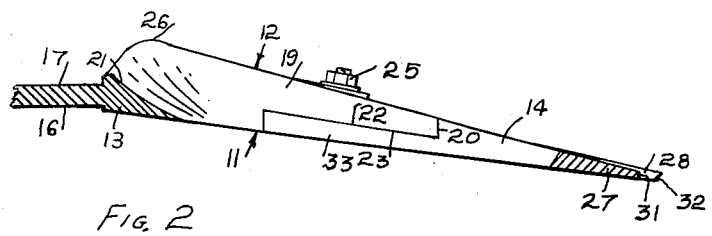
FIGURE 2 is a sectional view taken along line 2—2 in FIGURE 1.

The hub 13 is dished, so that the surface 11 is concave and the center of the hub is displaced from the ends 20 of spokes 19. The spokes 19 are also increasingly thick on the side 12, rising gradually from end 20 to a maximum thickness at 26, then reducing to the thickness between surfaces 16 and 17. This contour is best seen in FIGURE 2. The side 12 therefore has a general convex appearance.

The rim 14 is generally circular and has a smooth ring 27 upon which are formed lugs 28 which project above surface 12 and beyond the periphery of ring 27. The edges 31 and 32 of ring 27 and lugs 28 respectively are relatively thin to provide cutting penetration by the wheel 10 in operation.

Inwardly radiating spokes 33 formed integrally with ring 27 complete rim 14. The spokes 33 increase in thickness toward their inner ends and are stepped at 23 as previously discussed. Bolt holes 30 formed in spokes 33 are shaped to accommodate square shanked bolts having round heads which will lie flush with surface 11. The contour of surface 11 in rim 14 is concave and acts as a continuation of surface 11 in hub 13. The surface 12 of rim 14 is convex and also continues the contour of spokes 19 in hub 13.

The lugs 28 are of a general pyramid shape to provide high traction in the ground, while preventing the carrying of unnecessary dirt and mud. The webs 21 are formed so as to wedge any accumulated soil or mud outward as the wheel travels. The web 21 strengthens the spokes 19, which are more narrow circumferentially near the center of hub 13. This feature precludes the use of small crevices in which soil may become packed. The added thickness of spokes 19 at 26 provides adequate strength and rigidity.

The assembly, when completed as shown in FIGURES 1 and 2 provides a strong wheel with a virtually uninterrupted smooth inner surface 11. This is important in handling fragile beets which might be scored or broken by any uneven or rough projections.

The replacement cost advantages of two piece wheels were a major factor leading to their development. Since hub 13 never wears out, only rim 14 need be replaced periodically. This portion can be manufactured for less than half the cost of a comparable one piece wheel.

The wheel design having a circular ring 27 and projecting lugs 28 has been found to perform an efficient digging and lifting operation in the harvesting of sugar beets and has better soil traction than previous wheels using supokes alone or an uninterrupted rim. This design prevents skidding of the wheel at the moment of engagement with the beet. This momentary hesitation prevalent in smooth wheels is sufficient to cause beet breakage. The traction received by wheel 10 keeps the wheels rolling steadily for a smooth upward pull on the beet.

Various minor modifications in the design of this wheel will appear to one trained in this field. For this reason, the preceding description is to be taken as exemplary, but is not intended to define the limits of my invention, which are precisely termed in the following claims.

Having thus described my invention, I claim:

1. A digging wheel for sugar beet harvesters comprising a central hub having a plurality of dished spokes whose ends are axially displaced from the center of the hub, the axial thickness of the spokes being increasingly thick from their outer extremity to their connection with the center of the hub, dished webs connecting the spokes adjacent the center of the hub and forming a smooth continuous concave inner surface with the center of the hub and the spokes, a detachable dished rim comprising a circular ring of an inner diameter greater than the spokes of the hub, thin lugs formed about the outer periphery of the rim on its outer surface, a plurality of spokes radiating inwardly from the ring and corresponding in number and contour to the spokes of the hub, means to rigidly connect the spokes of the hub to the spokes of the rim to thereby form a wheel having continuous smooth surfaced spokes and a smooth inner surface for engaging beets.

2. The device as defined in claim 1 wherein said means to rigidly connect the spokes of the hub to the spokes of the rim includes complementing ridges on the surfaces of the respective spokes, a bolt hole through each pair of ridges and a bolt secured through said hole to connect the assembly as a unit.

References Cited in the file of this patent

UNITED STATES PATENTS

| | | |
|---|---|---|
| 2,682,739 | Bozeman et al. | July 6, 1954 |
| 2,773,343 | Oppel | Dec. 11, 1956 |

FOREIGN PATENTS

| | | |
|---|---|---|
| 421,776 | France | Mar. 4, 1911 |
| 487,139 | Canada | Oct. 14, 1942 |